United States Patent
Han et al.

(10) Patent No.: US 7,161,270 B2
(45) Date of Patent: Jan. 9, 2007

(54) LINE START RELUCTANCE SYNCHRONOUS MOTOR

(75) Inventors: Seung-Do Han, Incheon (KR); Hyoun-Jeong Shin, Gyeonggi-Do (KR); Jun-Ho Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/755,390

(22) Filed: Jan. 13, 2004

(65) Prior Publication Data

US 2005/0077801 A1  Apr. 14, 2005

(30) Foreign Application Priority Data

Oct. 14, 2003  (KR) .................. 10-2003-0071564

(51) Int. Cl.
*H02K 7/06* (2006.01)

(52) U.S. Cl. ................................. 310/156.81

(58) Field of Classification Search .......... 310/156.57, 310/156.81, 156.83, 156.84, 112, 114, 226
See application file for complete search history.

(56) References Cited

U.S. PATENT DOCUMENTS

| 2,974,242 | A |   | 3/1961 | Apstein |
|---|---|---|---|---|
| 3,758,800 | A |   | 9/1973 | McLaughlin |
| 4,469,970 | A | * | 9/1984 | Neumann ............... 310/156.78 |
| 4,761,602 | A | * | 8/1988 | Leibovich .................. 318/816 |
| 4,827,171 | A |   | 5/1989 | Bertram et al. |
| 6,269,290 | B1 | * | 7/2001 | Egami et al. .................. 701/22 |
| 6,525,442 | B1 | * | 2/2003 | Koharagi et al. ...... 310/156.48 |

FOREIGN PATENT DOCUMENTS

| DE | 3609351 | * | 9/1987 |
|---|---|---|---|
| DE | 42 24 757 | A1 | 2/1994 |
| EP | 1 267 475 | A2 | 12/2002 |
| JP | 4-322150 | A | 11/1992 |
| JP | 7-217997 |   | 8/1995 |
| JP | 7-298526 |   | 11/1995 |
| JP | 10-112945 |   | 4/1998 |
| JP | 10-248219 |   | 9/1998 |
| JP | 2001-86672 | A | 3/2001 |
| JP | 2001-86718 | A | 3/2001 |
| KR | 2001-0040256 |   | 5/2001 |
| KR | 2003-0059629 | A | 7/2003 |
| WO | WO9917431 | A1 | 4/1999 |
| WO | WO 01/45237 | A1 | 6/2001 |

* cited by examiner

*Primary Examiner*—Darren Schuberg
*Assistant Examiner*—Nguyen Hanh
(74) *Attorney, Agent, or Firm*—Birch, Stewart, Kolasch & Birch, LLP

(57) ABSTRACT

A line start reluctance synchronous motor includes: a single phase stator arranged at an inner circumferential surface of a motor body and on which a main coil and a sub coil are wound; a magnet unit free-rotatably arranged along an inner circumferential surface of the stator in order to maintain an air gap with the stator; and a cage rotor provided with a rotation shaft at a center portion thereof to be rotatable along an inner circumferential surface of the magnet unit.

14 Claims, 5 Drawing Sheets

LINE START RELUCTANCE SYNCHRONOUS MOTOR

This Nonprovisional application claims priority under 35 U.S.C. §119(a) on Patent Application No(s). 10-2003-0071564 filed in KOREA on Oct. 14, 2003, the entire contents of which are hereby incorporated by reference.

BACKGROUND OF THE INVENTION

1. Field of the Invention

The present invention relates to a line start reluctance synchronous motor, and more particularly, to a line start reluctance synchronous motor in which a magnet unit is free-rotatably installed between a stator and a cage rotor and the magnet unit and the cage rotor are synchronously operated.

2. Description of the Conventional Art

FIG. 1 is a longitudinal section view showing an induction motor in accordance with the conventional art, and FIG. 2 is a section view taken along line A—A of FIG. 1.

As shown in FIGS. 1 and 2, the conventional induction motor comprises a motor body 1 serving as a casing, a stator 2 arranged along an inner circumferential surface of the motor body 1, and an AC squirrel cage rotor 3 rotatably arranged based on a rotation shaft 4 at the center of the stator 2.

The stator 2 is formed of a lamination structure of a plurality of silicon steel sheets, and is provided with a plurality of coil winding teeth 5 therein. A plurality of slots 6 are formed between the coil winding teeth 5 with a certain interval, and coil 7 is wound on the coil winding teeth 5 through the slots 6.

The rotor 3 is formed of a lamination structure of a plurality of silicon steel sheets, a rotor bar hoe 9 is formed at the laminated sheet with a certain interval, and a rotor bar 10 of Aluminum is inserted into the rotor bar hole 9. An end ring 11 is connected to both ends, upper and lower portions of the rotor bar 10.

Operation of the conventional induction motor will be explained as follows.

When a power source is applied to the coil 7, a rotating magnetic field is generated by a current which flows in the coil 7 and an induction current is generated at the rotor bar 10.

By an interaction between the generated rotating magnetic field and the induction current, a rotation torque is generated at the rotor 3 and the rotation torque is outputted through the rotation shaft 4.

However, in the conventional induction motor, a current for generating the rotating magnetic field and an induction current generated from the rotor are supplied through coil connected to an external power source. At this time, due to a first loss generated from coil of the stator and a second loss generated from the rotor bar of the rotor, a current loss is excessively generated thus to lower efficiency.

SUMMARY OF THE INVENTION

Therefore, an object of the present invention is to provide a line start reluctance synchronous motor capable of lowering noise and enhancing efficiency by free-rotatably arranging a magnet unit between a stator and a cage rotor, by uniformly forming pole numbers of the stator, the magnet unit, and the cage rotor, and thus by synchronously operating the magnet unit and the cage rotor.

To achieve these and other advantages and in accordance with the purpose of the present invention, as embodied and broadly described herein, there is provided a line start reluctance synchronous motor comprising: a single phase stator arranged at an inner circumferential surface of a motor body and on which a main coil and a sub coil are wound; a magnet unit free-rotatably arranged along an inner circumferential surface of the stator in order to maintain an air gap with the stator; and a cage rotor provided with a rotation shaft at a center portion thereof to be rotatable along an inner circumferential surface of the magnet unit, provided with a cage bar at a peripheral portion thereof, and provided with magnetic barriers having the same pole numbers as the magnet unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a line start reluctance synchronous motor according to the present invention will be explained in more detail with reference to preferred embodiments.

Figure 1:
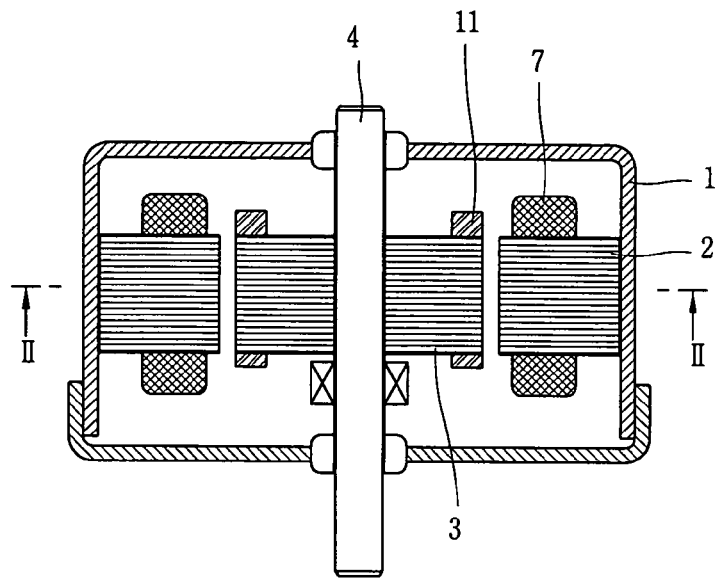
FIG. 1 is a longitudinal section view showing an induction motor in accordance with the conventional art.
Figure 2:
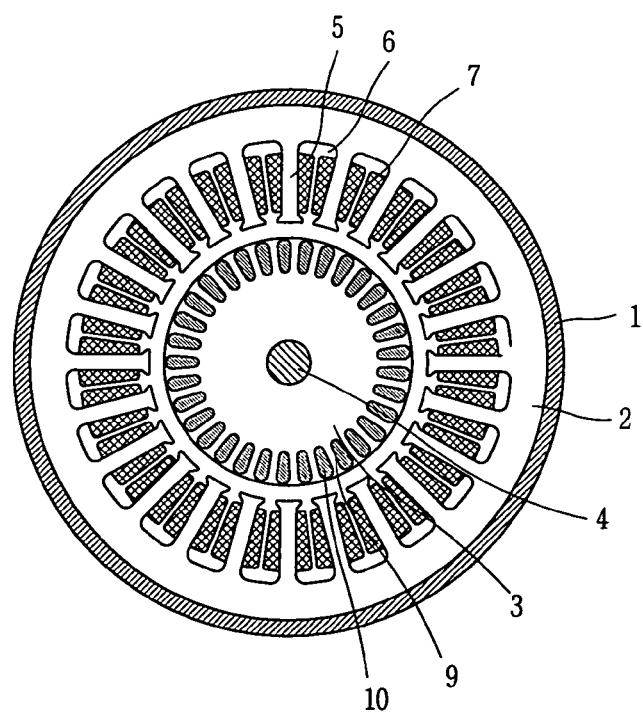
FIG. 2 is a section view taken along line II—II of FIG. 1.
Figure 3:
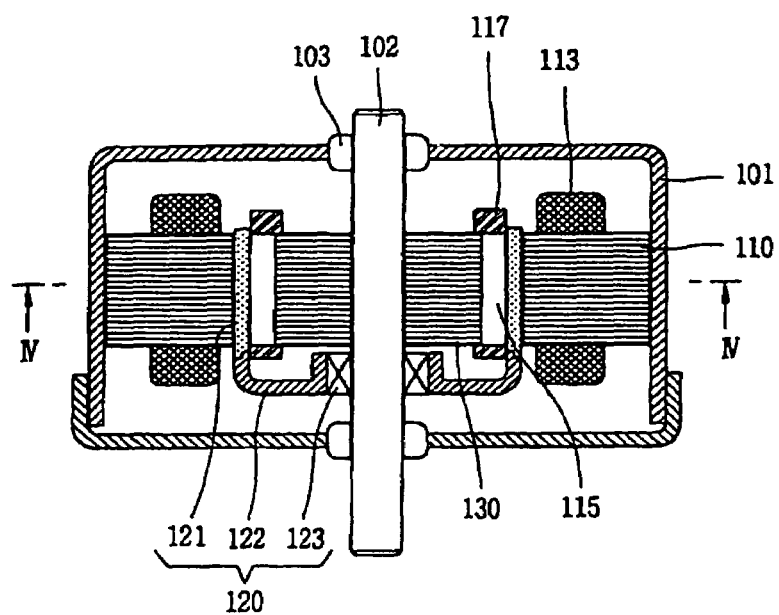
FIG. 3 is a longitudinal section view showing a line start reluctance synchronous motor according to the present invention.
Figure 4:
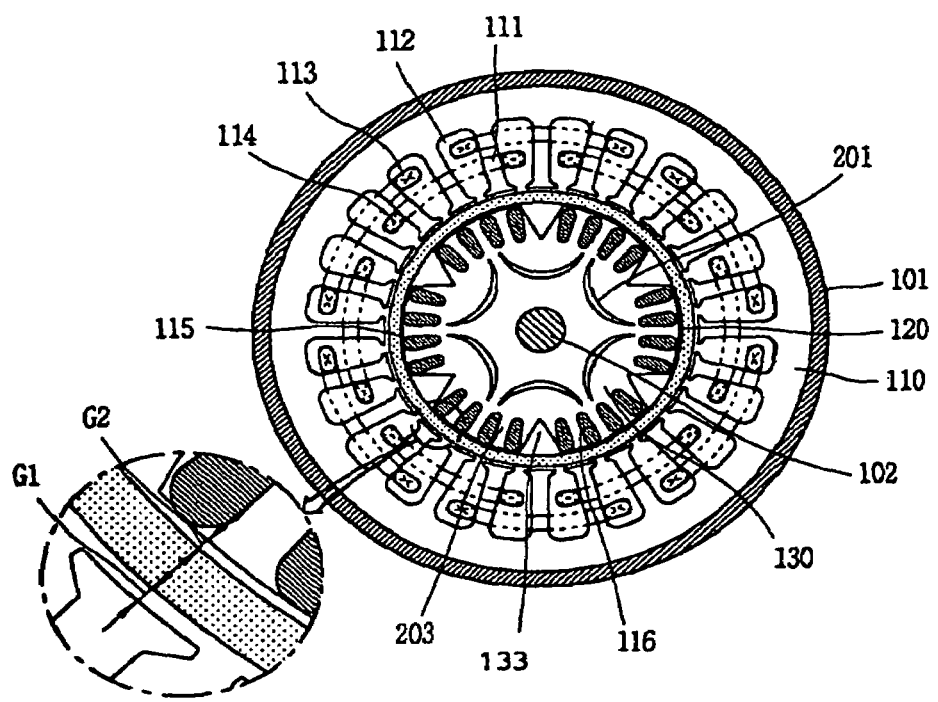
FIG. 4 is a sectional view taken along line IV—IV of FIG. 3.
Figure 5:
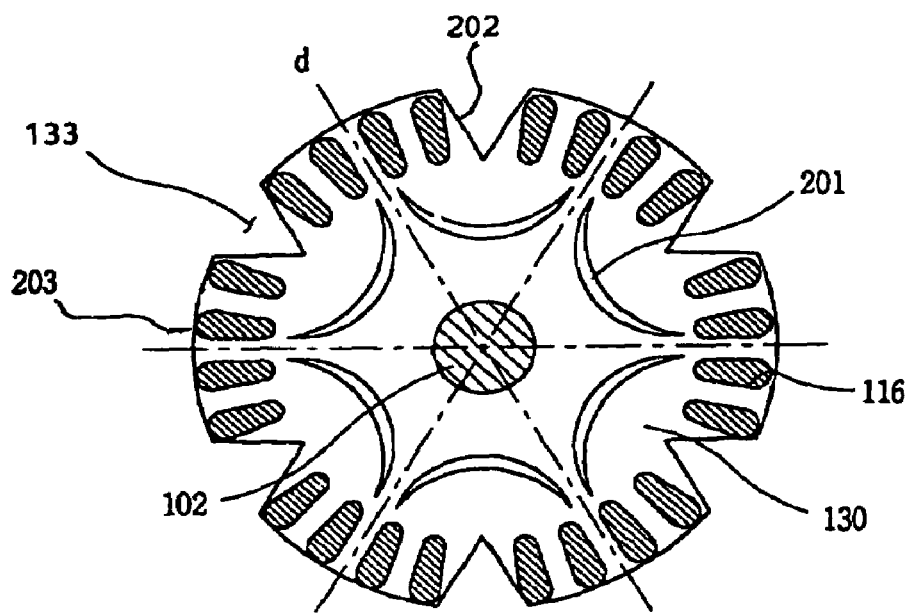
FIG. 5 is a view showing an extracted main part of FIG. 4.

FIG. 3 is a longitudinal section view showing a line start reluctance synchronous motor according to the present invention, FIG. 4 is a sectional view taken along line IV—IV of FIG. 3, and FIG. 5 is a view showing an extracted main part of FIG. 4.

As shown, the line start reluctance synchronous motor according to the present invention comprises: a single phase stator 110 arranged at an inner circumferential surface of a motor body 101 and on which a main coil 113 and a sub coil 114 are wound; a magnet unit 120 free-rotatably arranged along an inner circumferential surface of the stator 110; and a cage rotor 130 provided with a rotation shaft 102 at a center portion thereof to be rotatable along an inner circumferential surface of the magnet unit 120, provided with a cage bar 115 at a peripheral portion thereof, and provided with magnetic barriers 201 and 202 having the same pole numbers as the magnet unit 120.

The stator 110, the magnet unit 120, and the cage rotor 130 are arranged to always maintain constant intervals G1 and G2.

A rotation shaft 103 is arranged between the rotation shaft 102 and the motor body 101 thus to prevent the rotation shaft 102 from being influenced by the motor body 101.

The stator 110 is formed of a lamination structure of a plurality of silicon steel sheets, and is provided with a plurality of coil winding teeth 5 therein. A plurality of slots 112 are formed between the coil winding teeth 5 with a certain interval, and the main coil 113 and the sub coil 114 are wound on the coil winding teeth 5 through the slots 6.

The magnet unit 120 free-rotatably arranged between the stator 110 and the cage rotor 130 by a rotating magnetic field is constructed as follows.

First, a cylindrical ring magnet 121 is arranged between the stator 110 and the cage rotor 130, and a non-magnetic substance of a cup shape, a supporter 122 is coupled to one end of the ring magnet 121. Also, a bearing 123 is forcibly inserted into a center of the supporter 122 to be rotatably coupled to an outer circumferential surface of the rotation shaft 102.

The cage rotor 130 is formed of a lamination structure of a plurality of silicon steel sheets, and is provided with a salient 203 having the same pole numbers as the magnet unit 120 at an outer circumferential surface thereof.

A plurality of magnetic barriers 202 are formed at the rest surface of the cage rotor 130 excluding the cage bar 115.

The magnetic barriers 201 are formed as a circular arc shape between the rotation shaft 102 and the salient 203, and an air space portion 133 is formed between each salient 203.

The magnetic barriers 201 gradually become large towards a circumferential direction of the cage rotor 130 on the basis of the rotation shaft 102, and three pairs of magnetic barriers 201 are arranged on the basis of each d axis.

A plurality of cage bar holes 116 are formed with a certain interval at a peripheral portion of the cage rotor 130, and the cage bar 115 of Al or Cu is inserted into the cage bar hole 116 by a die casting method. Also, an end ring 117 is connected to both ends, upper and lower portions of the cage bar 115.

Hereinafter, operation of the line start reluctance synchronous motor according to the present invention will be explained as follows.

When a power source is applied to the main coil 113, the magnet unit 120 is freely rotated by a current which flows in the main coil 113.

At this time, the supporter 122 is freely rotated on the basis of the rotation shaft 102 by the bearing 123 thereof, and the magnet unit 120 is freely rotated since the ring magnet 121 is coupled to the supporter 122.

The magnet unit 120 is rotated and at the same time, generated a rotating magnetic field of a strong magnetic flux, thereby rotating the cage rotor 130.

That is, by the rotating magnetic field of the stator 110, the magnet unit 120 of a low inertia state is operated, rotated, and synchronized. At the same time, the magnet unit 120 generates a rotating magnetic field and supplies a torque generating magnetic flux to the cage rotor 130, thereby rotating the cage rotor 130.

At this time, since the magnet unit 120 has the same pole numbers as the cage rotor 130, the cage rotor 130 is operated with a synchronous speed with the magnet unit 120 without a slip.

As aforementioned, the synchronous speed can be expressed as 120*F/P (herein, F denotes a power source frequency (Hz), and P denotes pole numbers). When the power source frequency is supposed to be constant, the synchronous speed is determined by the pole numbers. Accordingly, since the pole numbers of the stator 110, the pole numbers of the magnet unit 120, and the pole numbers of the cage rotor 130 are the same one another, the magnet unit 120 is synchronized with the stator 110 and the cage rotor 130 is synchronized with the magnet unit 120.

Figure 6:
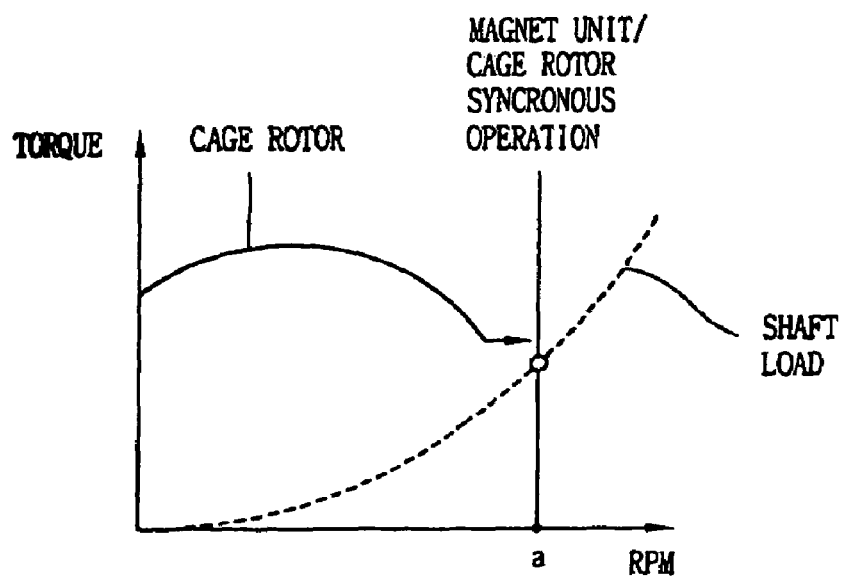
FIG. 6 is a graph showing a synchronous operation of a magnet unit and a cage rotor for a torque and rpm.

FIG. 6 is a graph showing a synchronous operation of the magnet unit and the cage rotor for a torque and rpm.

As shown, a thin solid line shows the cage rotor, a dotted line shows a load of the rotation shaft, and a thick solid line shows a synchronous operation of the magnet unit and the cage rotor.

Referring to FIG. 6, when the cage rotor and rpm of the rotation shaft reach a synchronization speed point 'a', the number of rotation is always maintained constantly on the vertical line of the 'a' point regardless of a load thereby to perform a synchronization operation.

Figure 7:
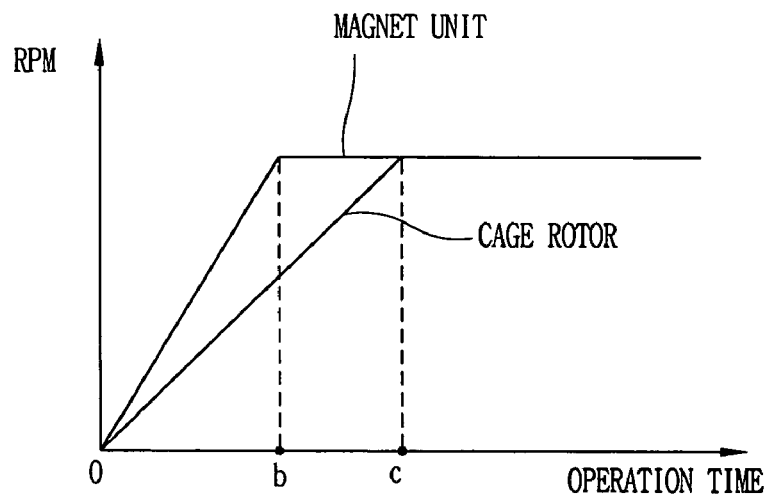
FIG. 7 is a graph showing a synchronous operation of the magnet unit and the cage rotor for operation time and rpm.

FIG. 7 is a graph showing a synchronous operation of the magnet unit and the cage rotor for operation time and rpm.

As shown, a thin solid line shows the cage rotor and a thick solid line shows the magnet unit.

Referring to FIG. 7, up to an initial time b, rpm of the cage rotor and rpm of the magnet unit are different each other thus to generate a slip. However, after a certain time point 'c', the rpm of the cage rotor becomes the same as the rpm of the magnet unit.

That is, the cage rotor and the magnet unit are synchronously operated by being rotated with the same synchronous speed thus not to generate a slip. According to this, a second current loss is not generated and thereby a low noise operation and a high efficiency operation are possible.

Figure 8:
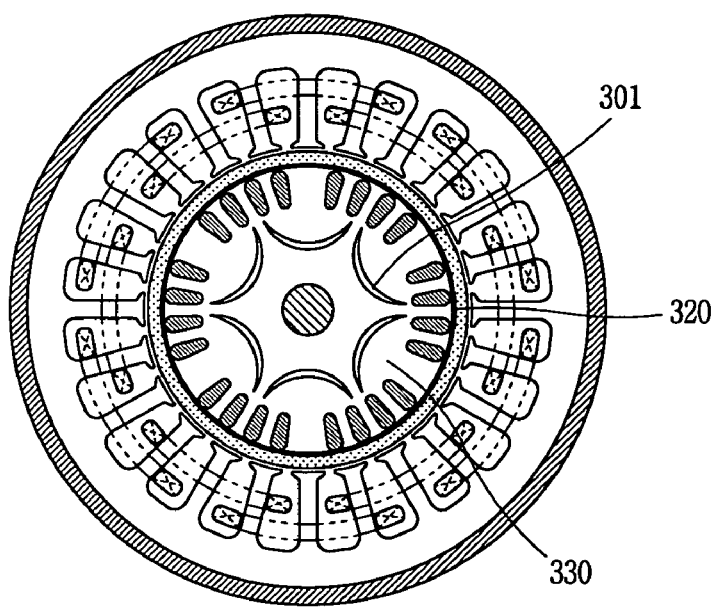
FIG. 8 is a longitudinal section view showing another embodiment of the cage rotor in the line start reluctance synchronous motor according to the present invention.

FIG. 8 is a longitudinal section view showing another embodiment of the cage rotor in the line start reluctance synchronous motor according to the present invention.

As shown, a plurality of inner magnetic barriers 301 are formed as a circular arc shape at an inner side of a cage rotor 330.

The inner magnetic barriers 301 have the same pole numbers as a magnetic unit 320.

Figure 9:
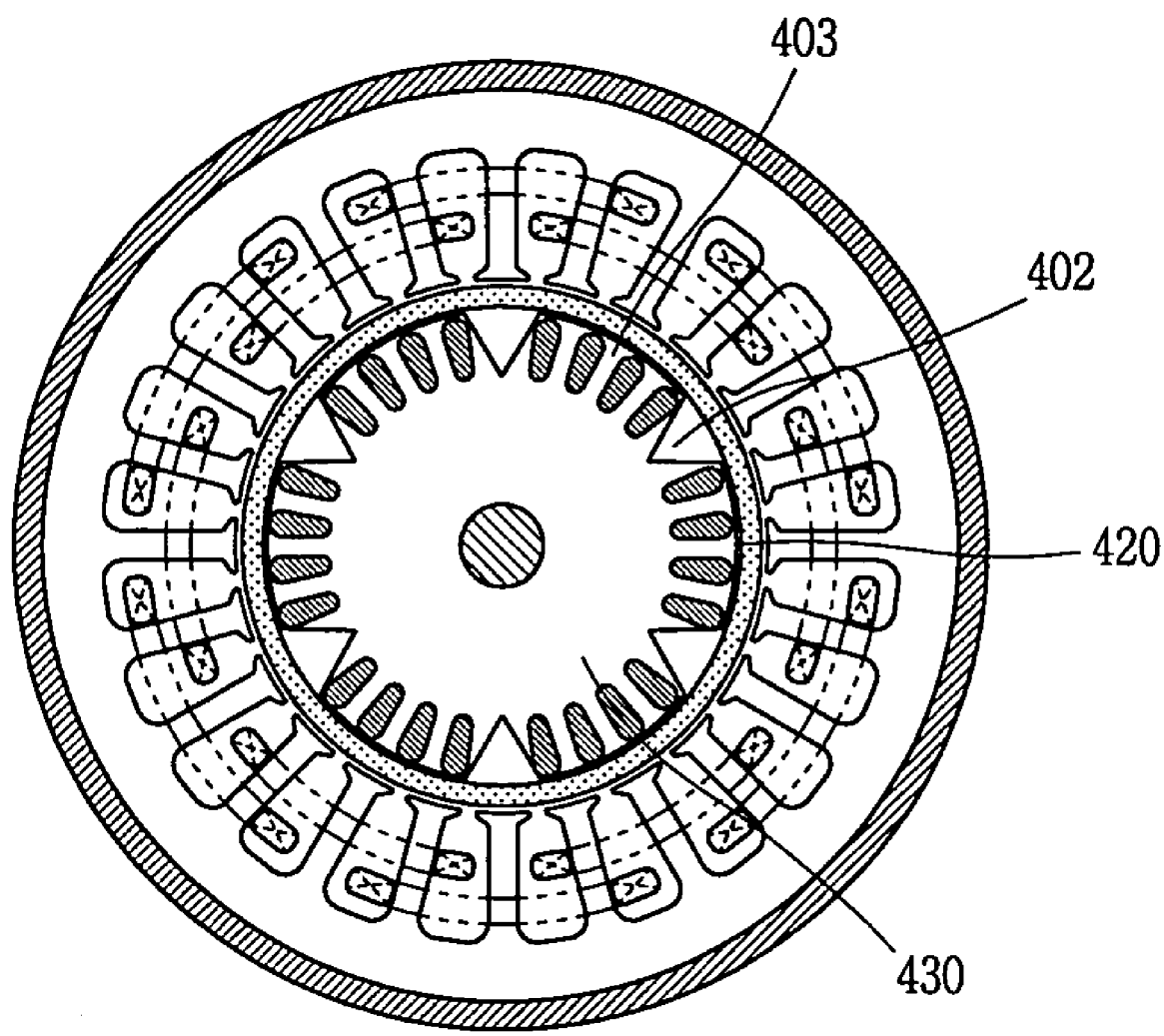
FIG. 9 is a longitudinal section view showing still another embodiment of the cage rotor in the line start reluctance synchronous motor according to the present invention.

FIG. 9 is a longitudinal section view showing still another embodiment of the cage rotor in the line start reluctance synchronous motor according to the present invention.

As shown, a plurality of outer magnetic barriers 402 are formed at an outer circumferential surface of a cage rotor 430.

The outer magnetic barriers 402 are formed as a wedge shape with a certain interval, and have the same pole numbers as a magnet unit 420.

A salient 403 is formed between the outer magnetic barriers 402.

As aforementioned, according to the present invention, the magnet unit is free-rotatably installed between the stator and the cage rotor, and the pole numbers of the stator, the pole numbers of the magnet unit, and the pole numbers of the cage rotor are the same one another thus to synchronously operate the magnet unit and the cage rotor, thereby enabling a low noise operation and a high efficiency operation with a low cost.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A line start reluctance synchronous motor comprising:
   a single phase stator arranged at an inner circumferential surface of a motor body and on which a main coil and a sub coil are wound;
   a magnet unit free-rotatably arranged along an inner circumferential surface of the stator in order to maintain an air gap with the stator; and
   a cage rotor provided with a rotation shaft at a center portion thereof to be rotatable along an inner circumferential surface of the magnet unit, wherein the cage rotor includes:
   a number of poles; and
   a plurality of first magnetic barriers, the number of the magnetic barriers being equal to the number of poles of the cage rotor.

2. A line start reluctance synchronous motor comprising:
   a single phase stator arranged at an inner circumferential surface of a motor body and on which a main coil and a sub coil are wound;
   a magnet unit free-rotatably arranged along an inner circumferential surface of the stator in order to maintain an air gap with the stator; and
   a cage rotor provided with a rotation shaft at a center portion thereof to be rotatable along an inner circumferential surface of the magnet unit, wherein the cage rotor includes:
   a number of poles;
   a plurality of cage bars at a peripheral portion thereof;
   a plurality of first magnetic barriers located at an outer circumferential surface of the cage rotor, the number of the first magnetic barriers being equal to the number of poles of the cage rotor; and
   a plurality of second magnetic barriers located at an inner side surface of the cage rotor, the number of the second magnetic barriers being equal to the number of poles of the cage rotor.

3. The line start reluctance synchronous motor of claim 2, wherein the second magnetic barriers are formed as a circular arc shape.

4. The line start reluctance synchronous motor of claim 3, wherein the second magnetic barriers become larger towards a circumferential direction of the cage rotor.

5. The line start reluctance synchronous motor of claim 3, wherein the first magnetic barriers are formed with as a V shape.

6. The line start reluctance synchronous motor of claim 5, wherein a salient is formed between the first magnetic barriers.

7. The line start reluctance synchronous motor of claim 2, wherein the first magnetic barriers are formed with as a V shape.

8. The line start reluctance synchronous motor of claim 7, wherein a salient is formed between the first magnetic barriers.

9. A line start reluctance synchronous motor comprising:
   a single phase stator arranged at an inner circumferential surface of a motor body and on which a main coil and a sub coil are wound;
   a magnet unit free-rotatably arranged along an inner circumferential surface of the stator in order to maintain an air gap with the stator; and
   a cage rotor provided with a rotation shaft at a center portion thereof to be rotatable along an inner circumferential surface of the magnet unit, wherein the cage rotor includes:
   a number of poles;
   a plurality of cage bars at a peripheral portion thereof; and
   a plurality of magnetic barriers, the number of the magnetic barriers being equal to the number of poles of the cage rotor.

10. The line start reluctance synchronous motor of claim 9, wherein the magnetic barriers are formed with a certain interval at an outer side surface of the cage rotor.

11. The line start reluctance synchronous motor of claim 10, wherein a salient is formed between the magnetic barriers.

12. The line start reluctance synchronous motor of claim 9, wherein the magnetic barriers are formed with a certain interval at an inner side surface of the cage rotor.

13. The line start reluctance synchronous motor of claim 12, wherein the magnetic barriers are formed as a circular arc shape.

14. The line start reluctance synchronous motor of claim 13, wherein the magnetic barriers become larger towards a circumferential direction of the cage rotor.

* * * * *